United States Patent [19]

Wingate

[11] Patent Number: 4,631,520

[45] Date of Patent: Dec. 23, 1986

[54] POSITION ENCODER COMPENSATION SYSTEM

[75] Inventor: Sidney A. Wingate, Concord, Mass.

[73] Assignee: Dynamics Research Corporation, Wilmington, Mass.

[21] Appl. No.: 618,509

[22] Filed: Jun. 8, 1984

[51] Int. Cl.⁴ ...................... H03K 13/02; H03K 13/18
[52] U.S. Cl. .......................... 340/347 CC; 340/347 P
[58] Field of Search ...................... 340/347 CC, 347 P; 250/237 G, 231 SE; 356/395

[56] References Cited

U.S. PATENT DOCUMENTS 4,484,816  11/1984  Ohtomo et al. ................ 250/237 G
4,491,826  1/1985   Krogh et al. ................. 250/231 SE
4,507,647  3/1985   Minami et al. ................ 250/237 G Primary Examiner—William M. Shoop, Jr.
Assistant Examiner—Sharon D. Logan
Attorney, Agent, or Firm—Weingarten, Schurgin, Gagnebin & Hayes

[57] ABSTRACT

A compensation system for a position encoder which automatically compensates for scale and other similar errors along the entire path of relative motion. The phase of the encoder signals is altered by a small amount for each small increment of relative motion to provide encoder signals compensated for the scale error. The phase correction is added or subtracted from the phase of the encoder signals depending upon the sense of relative motion.

15 Claims, 5 Drawing Figures

POSITION ENCODER COMPENSATION SYSTEM

FIELD OF THE INVENTION

This invention relates to position encoders and transducers and more particularly to apparatus and techniques for compensation of scale and similar errors.

BACKGROUND OF THE INVENTION

Electro-optical incremental encoders or transducers are known for measurement of linear or rotary motion or position. Such encoders include a scale of alternately light responsive and opaque segments which is cooperative with an optical head to provide an optical pattern representative of motion of the head relative to the scale. Electrical signals are derived from the optical pattern which represent the relative motion, and these signals are usually processed to produce a digital count indicative of distance travelled by the head relative to the scale. Scale errors such as variations in the width and spacing of the scale segments can cause errors in measurement of distance along the intended path. Such errors can become significant especially in high resolution encoders in which a high density optical pattern is provided on the encoder scale. Scale error has been treated heretofore by adjustment in the encoder electronics to add or subtract a single count at predetermined intervals of distance along the scale to alter proportionally the total count in order to minimize the error component. This type of compensation is not satisfactory in that the count correction is made in a single step at predetermined intervals of encoder travel, and the compensation is especially unsatisfactory if motion is being sensed in the vicinity of the scale at which the compensating count is provided. Similar errors can occur in position encoders or transducers of other than electro-optical type.

SUMMARY OF THE INVENTION

In brief the present invention provides a compensation system for a position encoder or transducer which automatically compensates for scale and other similar errors along the entire path of relative motion. The phase of the encoder signals is altered by a small amount for each small increment of relative motion to provide encoder signals compensated for the scale error. The phase correction is added or subtracted from the phase of the encoder signals depending upon the sense of relative motion. For a linear encoder, the scale error is preferably represented by a best straight line function, and a correction factor is derived which is representative of the slope of this error function.

The encoder provides sinusoidal signals which are applied to a displacement counter operative to provide an output signal for each predetermined amount of movement of the encoder head relative to the encoder scale. The displacement counter receives an input derived from a measurement of the scale error, and this input determines the amount of relative movement for which a correction output is provided. The displacement counter drives counter and switching logic which provides the requisite phase correction to the encoder signals throughout its path of travel. The phase compensated encoder signals are then employed as the encoder output for display or other utilization purposes. Usually the encoder signals prior to utilization are applied to cycle interpolation logic which, as is known, is operative to increase the resolution of the encoder output signals.

The invention is useful for any linear or rotary encoder or transducer which provides sine wave signals representing input motion, and compensation can be provided for any repeatable phase error function. In general, a representation of the error function is stored and a phase correction is applied by appropriate shifting of the phase of the encoder signals in accordance with the stored error function.

DESCRIPTION OF THE DRAWINGS

The invention will be more fully understood from the following detailed description taken in conjunction with the drawings in which.

DETAILED DESCRIPTION OF THE INVENTION

In the preferred embodiment the invention is employed with a linear encoder which includes an elongated scale disposed along a path to be monitored, and an electro-optical head which is mounted for movement relative to the scale and which provides electrical signals representative of relative motion or position along the travel path. In a typical installation, the head is fixed to a machine tool or other apparatus, while the scale is attached to a movable element for motion forward and backward along the length of the scale. The encoder output is usually a measure of the distance travelled by the scale along the head with respect to a reference position, and is often in the form of a numerical display indicative of distance. The encoder output signals can also be employed in a control system for automatic control of machine elements and the like.

Figure 1:
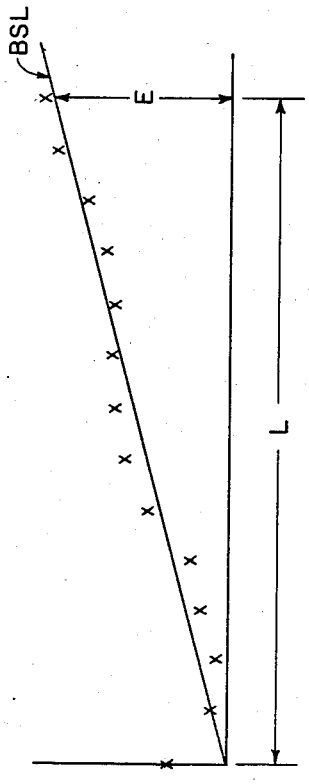
FIG. 1 is a typical error plot for a linear encoder scale including a best straight line approximation of the measured error points.

The linear encoder scale has errors which can result in corresponding errors in output measurement. The scale errors are caused by variations in the width and/or spacing of the light responsive segments, which variations are caused by errors or variations in the manufacture of the scale, thermal expansion and contraction of the scale during use or bending of the scale in an installed position. A typical error plot for a linear encoder scale is illustrated in FIG. 1. A succession of measurement points are plotted along a scale length L. A best straight line (BSL) is fitted to the measured points to provide a straight line error function having a slope E/L. This best straight line error function is a good approximation of the actual error and is advantageous in its simplicity of utilization in the novel compensation system of the present invention. However, the invention is not limited to this particular error function, as the invention can also be implemented for use with other error functions which may be desirable in specific instances. The best straight line function can be represented by a number which is indicative of the slope of the error curve and a sign signal or bit which denotes the positive or negative sense of the slope. The slope of the BSL curve is independent of the line density or resolution of the encoder scale.

Figure 2:
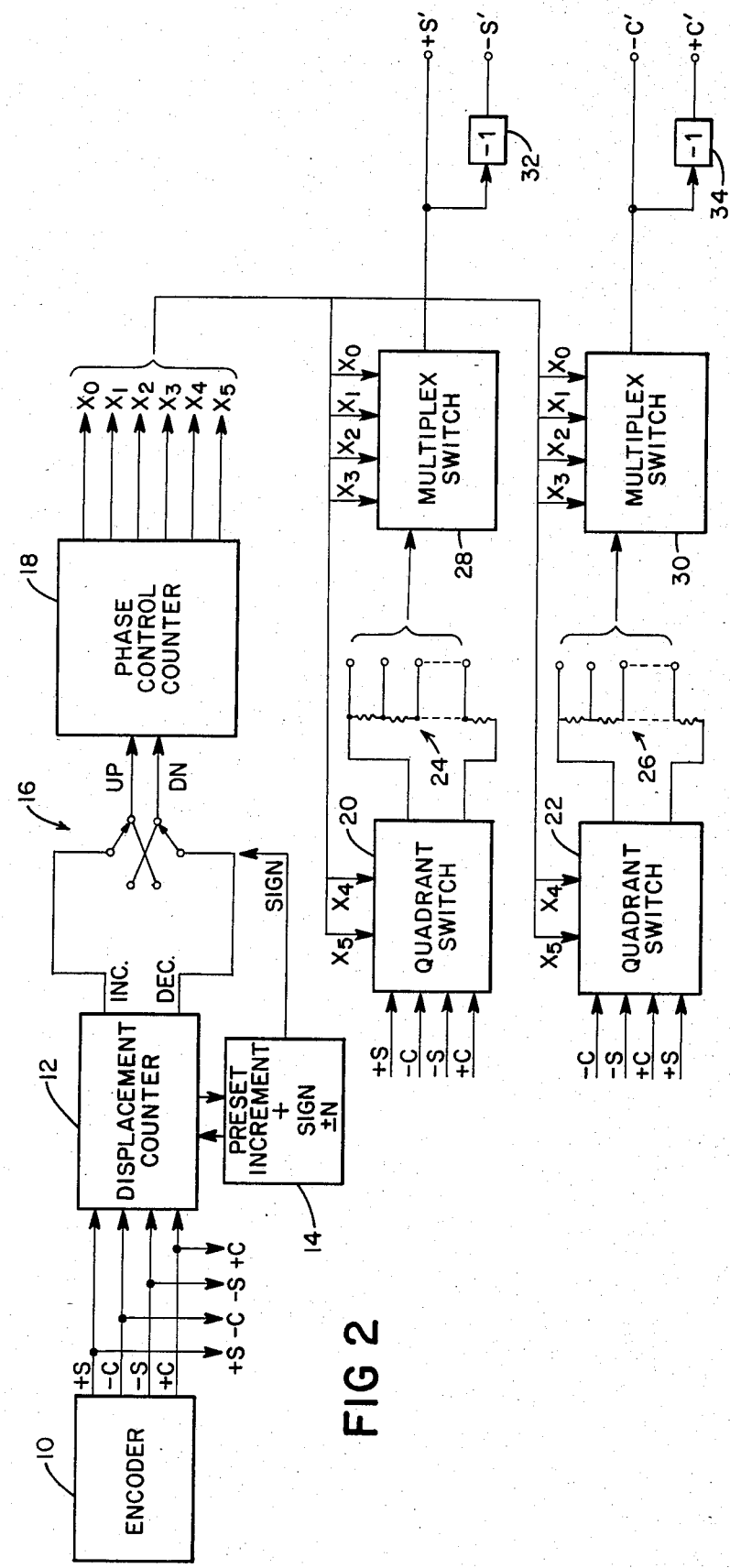
FIG. 2 is a block diagram of the error compensation system in accordance with the invention.
Figure 3:
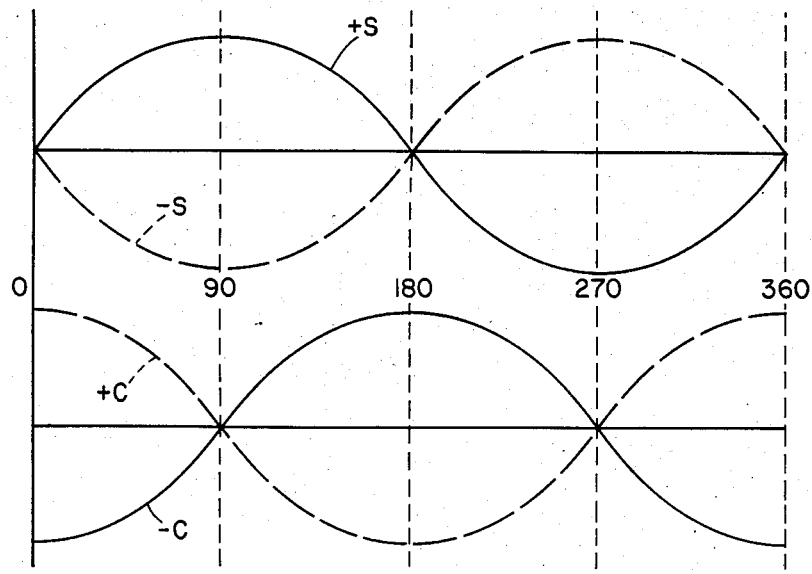
FIG. 3 depicts the four quadrature phased encoder signals.

The system embodying the invention is shown in block diagram form in FIG. 2. An encoder 10 provides an electrical output for four sine wave signals, +S, −S, +C and −C. The signals are composed of two complementary pairs of sine waves each phase displaced from the other by 90 degrees. Thus four quadrature phased signals are provided, as illustrated in FIG. 3. These signals are applied to a displacement counter 12 which is operative to provide an output pulse for each predetermined movement of the encoder scale relative to the encoder head. The counter 12 provides an increment output pulse for relative motion of one direction and a decrement output pulse for relative motion of the opposite direction. A preset input to counter 12 is provided by control 14. The control 14 provides the displacement increment for which counter 12 will provide an output. Thus, for each predetermined movement of the encoder scale relative to the head, the counter 12 provides an increment pulse or a decrement pulse, in accordance with the sense of motion. The output of counter 12 is applied via a reversing switch 16 to a phase control counter 18. The reversing switch is controlled by the sign bit from control 14. The sign of the error slope is determined when the error function is initially plotted. The sign bit input from control 14 to counter 12 is then set for that particular scale error. If a different scale is installed, an error plot for this new scale would be made, and the slope of the error curve determined. The sign bit from control 14 will be set to be positive or negative depending upon the slope of the error curve for the new scale. In the illustrated example, the BSL curve of FIG. 1 has a positive slope, and thus a positive sign bit is provided by control 14 to switch 16. The switch remains in the position shown for the particular error slope. If the error slope were negative, the switch position would be reversed.

The preset value N applied by control 14 to counter 12 is determined by:

$$N = K/(E/L)$$

where K is the portion of the line-space cycle of the encoder scale by which the phase is shifted; and E/L is the slope of the best straight line error function. In the illustrated embodiment, K is 1/64 and therefore a phase correction is made for each 1/64th of a scale cycle or 5.625 degrees, which correspond to 31.25 microinches. As an example, for a scale having 500 lines per inch, the line-space cycle $\Delta C_y$ is 0.002", and a best straight line error slope (E/L) of $25 \times 10^{-6}$ (25 ppm), the value N is 625. The displacement increment for each phase shift correction is $N(\Delta C_y) = 1.25"$. Therefore, for each scale movement of 1.25", a phase shift correction of 5.625 degrees is provided.

The counter 18 provides a multiple bit digital signal representative of the number of displacement increments traversed by the encoder scale relative to the head. This counter output signifies the total phase compensation which is to be made. The output signal or code from counter 18 is employed to control the operation of the quadrant switches 20 and 22 and the multiplex switches 28 and 30 to accomplish the desired phase correction. The bits $X_4$ and $X_5$ specify the quadrant of the accumulated phase compensation. The bits $X_0$–$X_3$ specify the phase of the selected quadrant to be added to the encoder signal phase for purposes of correction.

The quadrant switches 20 and 22 are controlled by the two most significant bits ($X_4$, $X_5$) of the output signal from counter 18. The output of each quadrant switch is applied to respective resistor networks 24 and 26, the outputs of which are applied to respective multiplex switches 28 and 30. The four least significant bits ($X_0$–$X_3$) of the output signal from counter 18 are employed to control the operation of the multiplex switches 28 and 30. The output of switch 28 provides the compensated encoder signal +S', and after inversion by the inverter 32 provides the complementary encoder signal −S'. The switch 30 provides the compensated encoder signal −C', and after inversion by inverter 34 provides the complementary encoder signal +C'.

Figure 4:
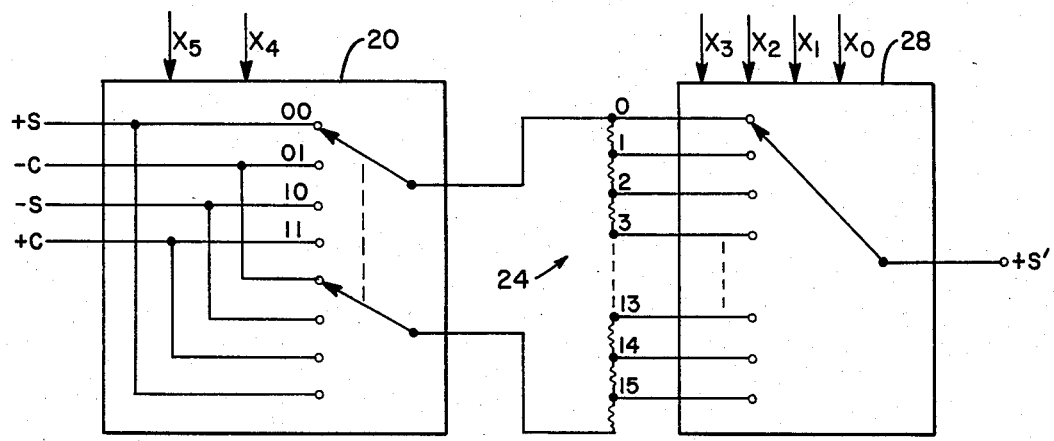
FIG. 4 is a schematic representation of the switching logic of FIG. 2.

The quadrant switch 20 is illustrated schematically in FIG. 4 together with the associated resistor network 24 and multiplex switch 28. The quadrant switch 22 is similarly implemented. The quadrant switch 20, resistor network 24 and multiplex switch 28 comprise a sine channel, while a cosine channel is provided by quadrant switch 22, resistor network 26 and multiplex switch 30. The quadrant switches 20 and 22 provide quadrature phased signals to the respective resistor networks for each phase quadrant of the accumulated phase applied encoder signals. For signals from counter 18 in the first quadrant; that is, for an accumulated phase compensation signal having a phase between 0 and 90 degrees, the quadrature information is provided by the encoder signals +S and −C. As shown in FIG. 4, the quadrant switch 20 couples the signals +S and −C to the resistor network 24. For signals from counter 18 in the second quadrant; that is, for signals have a phase between 90 and 180 degrees, the switch 20 will be connected to the switch taps to couple the signals −S and −C to the resistor network 24. In similar manner for encoder signals in the third quadrant, the switch 20 couples the signals −S and +C to the resistor network. For signals in the fourth quadrant, the switch 20 couples the signals +C and +S to the resistor network.

Each tap of the resistor networks 24 and 26 provides a weighted sum of the applied signals to produce the desired phase shift for phase compensation. The multiplex switches 28 and 30 are operative to select sequentially each of the taps of the corresponding resistor networks 24 and 26. The number of resistors and resistor taps is provided in accordance with the intended phase compensation factor which is to be added (or subtracted) to the encoder signal to provide compensation. In the illustrated embodiment sixteen resistors are provided to provide a compensation factor of 5.625 degrees (90°/16). The switches 28 and 30 are each operative to switch to a succeeding tap of respective resistor networks 24 and 26 for each preselected incremental movement of the encoder. In the illustrated embodiment, for each incremental movement of 1.25", the switches 28 and 30 each select the next tap of the respective networks 24 and 26, as governed by the digital code from counter 18. Phase compensation is increments of 5.625 degrees is provided by the networks 28 and 30. Thus, tap 1 of network 24 provides 5.625 degrees of phase shift, tap 2 provides twice this phase shift, tap 3 provides three times the 5.625 degree amount etc. Network 26 is operative in the same manner. The networks 24 and 26 can be considered as two legs of a resistor bridge. The network 24 provides first quadrant correction. The network 26 provides second quadrant correction. Since third quadrant signals are complementary to those of the first quadrant, the compensation signals for the third quadrant are easily derived by inverting the signals provided by network 24. Similarly, the compensation signals for the fourth quadrant are complementary to those of the second quadrant and are derived by inverted versions of the signals from network 26. This is as illustrated in FIG. 2 where the compensated signals $+S'$ and $-C'$ are provided by the respective networks 24 and 26, and the compensated signals $-S'$ and $+C'$ are derived by inversion of the respective signals $+S'$ and $-C'$.

Figure 5:
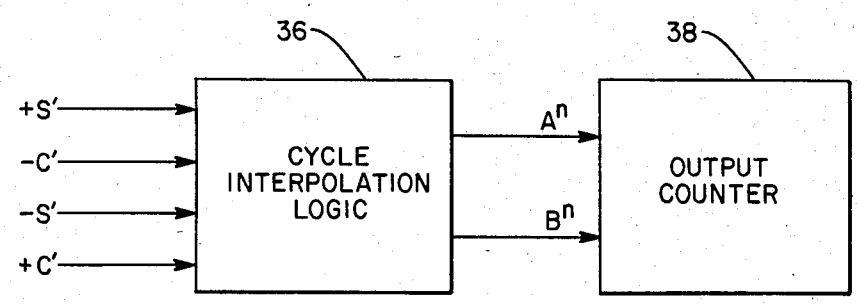
FIG. 5 is a block diagram of the cycle interpolation logic and output counter utilized in the invention.

The compensated signals are applied to cycle interpolation logic (FIG. 5) the outputs of which are applied to an output counter 38 which provides an output indication of encoder travel along the defined path. The cycle interpolation logic 36 is operative to increase the resolution of the encoder output signals and provides the enhanced resolution that would be provided by an encoder scale of greater line density, but without the necessity for such a finer resolution scale. The cycle interpolation technique is itself known in the art and is the subject of prior patents of the same inventor as herein; U.S. Pat. Nos. 3,265,902, 3,310,798 and 3,312,828.

The invention is not to be limited to that which has been particularly shown and described, except as indicated in the appended claims.

What is claimed is:

1. For use with a position encoder having a scale and a head movable relative to the scale, and providing encoder signals representing the position of the head relative to the scale, a system for compensating for scale error comprising:
   means for storing prior to operation a correction signal representing an error function of the scale as determined prior to operation;
   means for providing a signal indication of each predetermined increment of relative motion; and
   means operative in response to the signal indication to combine the correction signal with the encoder signals and provide output signals compensated for scale error.

2. For use with a position encoder having a scale and a head relatively movable along the scale and providing sinusoidal encoder signals representing the position of the head relative to the scale, a system for compensating for scale error comprising:
   means operative in response to the encoder signals for providing a signal indication of each predetermined increment of relative motion;
   means for providing phase correction signals representing an error function of the scale; and
   means operative in response to the signal indication to combine the phase correction signal with the encoder signals and provide output signals compensated for scale error.

3. The invention of claim 2 wherein the predetermined increment is small compared to the scale period.

4. The invention of claim 3 wherein the phase correction is small compared to phase change of the encoder signals over the predetermined increment.

5. The invention of claim 2 wherein the scale error is from variations in the width and/or spacing of sensible indicia of the scale.

6. For use with a transducer including a scale having a sensible pattern thereon which exhibits a repeatable error function, and a head movable relative to the scale and operative to sense said pattern and provide sine wave signals representing said relative motion, a system for compensating for the error function of the scale comprising:
   means for storing a representation of the error function;
   means for shifting the phase of the encoder signals in accordance with the stored error function representation.

7. For use with a transducer including a scale having a sensible pattern thereon which exhibits a repeatable error function, and a head movable relative to the scale and operative to sense said pattern and provide sine wave signals representing said relative motion, a system for compensating for the error function of the scale comprising:
   means for providing a signal indication of each predetermined increment of relative motion;
   means for providing a phase correction signal representing the error function of the scale; and
   means operative in response to the signal indication to combine the phase correction signal with the encoder signals.

8. A position encoder having a scale and a head movable relative to the scale;
   means providing encoder signals representing the position of the head relative to the scale;
   means for compensating for scale error comprising:
   means for storing prior to operation a correction signal representing an error function of the scale as determined prior to operation;
   means operative in response to the encoder signals for providing a signal indication of each predetermined increment of relative motion; and
   means operative in response to the signal indication to combine the correction signal with the encoder signals and provide output signals compensated for scale error.

9. A position encoder having a scale and a head relatively movable along the scale;
   means for providing sinusoidal encoder signals representing the position of the head relative to the scale;
   means for compensating for scale error comprising:
   means operative in response to the encoder signals for providing a signal indication of each predetermined increment of relative motion;
   means for providing phase correction signals representing an error function of the scale; and
   means operative in response to the signal indication to combine the phase correction signal with the encoder signals and provide output signals compensated for scale error.

10. The invention of claim 9 wherein the error function is a best straight line error function.

11. The invention of claim 9 wherein the position encoder is a linear encoder having a scale of alternately light responsive and opaque segments and wherein the scale error is a best straight line error function of the encoder scale.

12. The invention of claim 9 wherein the means operative in response to the encoder signals includes:
   a displacement counter operative in response to the encoder signals for providing a pulse signal for each predetermined increment of relative motion.

13. The invention of claim 12 wherein the means for providing a phase correction signal includes:
   counter and switching logic responsive to pulse signals from the displacement counter and the encoder signals to provide the requisite phase correction.

14. The invention of claim 12 wherein the means for providing a phase correction signal includes:
a phase control counter providing a digital signal representative of the number of displacement increments traversed by the encoder scale relative to the head and representative of the total phase compensation to be made;
first and second means each operative in response to the encoder signals and the digital signal from the phase control counter to provide the phase correction signals.

15. The invention of claim 14 wherein the first and second means includes:
first and second quadrant switches each selectively receiving quadrature phased signals derived from the encoder signals and control signals derived from the digital signal from the phase control counter;
first and second resistor networks each coupled to a respective quadrant switch, each of the resistor networks having a plurality of taps, each tap providing a weighted sum of the applied signals to produce the desired phase shift for phase compensation; and
first and second multiplex switches each operative in accordance with the digital signal of the phase control counter to couple selected taps of respective resistor networks to an output.

* * * * *